US012323178B2

(12) United States Patent
Wang et al.

(10) Patent No.: US 12,323,178 B2
(45) Date of Patent: Jun. 3, 2025

(54) COMMUNICATION METHOD, COMMUNICATION CIRCUIT AND COMMUNICATION SYSTEM

(71) Applicant: ACTIONS TECHNOLOGY CO., LIMITED, Guangdong (CN)

(72) Inventors: Tao Wang, Guangdong (CN); Jiang Xiong, Guangdong (CN)

(73) Assignee: ACTIONS TECHNOLOGY CO., LIMITED, Guangdong (CN)

( * ) Notice: Subject to any disclaimer, the term of this patent is extended or adjusted under 35 U.S.C. 154(b) by 425 days.

(21) Appl. No.: 17/802,268

(22) PCT Filed: Oct. 13, 2020

(86) PCT No.: PCT/CN2020/120679
§ 371 (c)(1),
(2) Date: Aug. 25, 2022

(87) PCT Pub. No.: WO2021/212767
PCT Pub. Date: Oct. 28, 2021

(65) Prior Publication Data
US 2023/0079376 A1    Mar. 16, 2023

(30) Foreign Application Priority Data
Apr. 20, 2020    (CN) .......................... 202010310507.2

(51) Int. Cl.
*H04B 1/00* (2006.01)
*H04B 1/40* (2015.01)

(52) U.S. Cl.
CPC ...................................... *H04B 1/40* (2013.01)

(58) Field of Classification Search
CPC ........ H04B 1/40; H04B 3/548; H02J 7/00034
See application file for complete search history.

(56) References Cited

U.S. PATENT DOCUMENTS

| 6,181,167 | B1 * | 1/2001 | Agan | H03K 19/018592 |
| | | | | 326/86 |
| 6,424,119 | B1 | 7/2002 | Nelson et al. | |
| 6,895,022 | B1 * | 5/2005 | Kincaid | B60R 21/01 |
| | | | | 340/661 |
| 2009/0039833 | A1 * | 2/2009 | Kitagawa | H01M 10/48 |
| | | | | 320/134 |
| 2013/0044827 | A1 * | 2/2013 | Vladan | H04B 3/548 |
| | | | | 375/257 |
| 2020/0195030 | A1 * | 6/2020 | Long | H02J 7/00034 |
| 2021/0368256 | A1 * | 11/2021 | Liu | H04R 1/1025 |

(Continued)

FOREIGN PATENT DOCUMENTS

| CN | 1326615 A | 12/2001 |
| CN | 1534884 A | 10/2004 |
| CN | 1606255 A | 4/2005 |

(Continued)

*Primary Examiner* — Md K Talukder
(74) *Attorney, Agent, or Firm* — Foley & Lardner LLP

(57) ABSTRACT

Disclosed are a communication method, a communication circuit and a communication system. A first device can modulate, according to communication data to be sent, parameters of a current signal to be processed, so as to form a communication signal and output same to a second device, and the second device can parse the communication signal so as to obtain communication data.

14 Claims, 6 Drawing Sheets

(56) References Cited

U.S. PATENT DOCUMENTS

2022/0045552 A1* 2/2022 Zhou .................. H02J 50/90
2023/0079376 A1* 3/2023 Wang ................ H02J 7/00034
455/73

FOREIGN PATENT DOCUMENTS

| | | |
|---|---|---|
| CN | 204190462 U | 3/2015 |
| CN | 205407320 U | 7/2016 |
| CN | 106487084 A | 3/2017 |
| CN | 109417401 A | 3/2019 |
| CN | 109739792 A | 5/2019 |
| CN | 109995392 A | 7/2019 |

* cited by examiner

COMMUNICATION METHOD, COMMUNICATION CIRCUIT AND COMMUNICATION SYSTEM

CROSS-REFERENCE OF RELATED APPLICATIONS

This application is a US National Stage of International Application No. PCT/CN2020/120679, filed on Oct. 13, 2020, which claims priority to Chinese Patent Application No. 202010310507.2, filed with the China National Intellectual Property Administration on Apr. 20, 2020 and entitled "Communication Method, Communication Circuit and Communication System", which is hereby incorporated by reference in its entirety.

FIELD

The present application relates to the field of communication technologies, and particularly to a communication method, a communication circuit and a communication system.

BACKGROUND

With the development of science and technology, especially with the increasing popularity of portable devices, communication between devices is gradually increasing. How to minimize resources and flexibly implement the communication is a technical solution pursued by those skilled in the art.

Then, how to realize flexible communication between devices is a technical problem to be solved urgently by those skilled in the art.

SUMMARY

Embodiments of the present application provide a communication method, a communication circuit and a communication system, to realize the flexible communication between devices.

In a first aspect, an embodiment of the present application provides a communication circuit, the communication circuit is electrically connected to a transmission interface for transmitting a signal; where the communication circuit includes: a communication control module, a current modulation module, and a current demodulation module; the communication control module is electrically connected to the transmission interface, the current modulation module and the current demodulation module respectively, and is configured to: send a modulation signal to the current modulation module when determining that the communication circuit is currently in a communication state and sends out first communication data according to the signal transmitted by the transmission interface; or send a demodulation signal to the current demodulation module when determining that the communication circuit is currently in the communication state and receives second communication data according to the signal transmitted by the transmission interface; the current modulation module is further electrically connected to the transmission interface and a first power signal terminal respectively, and is configured to: modulate a parameter of a current signal provided by the first power signal terminal according to the first communication data under control of the received modulation signal, to obtain a first current signal and send the first current signal to the transmission interface, so that the transmission interface determines a first communication signal according to the first current signal; the current demodulation module is further electrically connected to the transmission interface, and is configured to: parse a second communication signal received through the transmission interface under control of the received demodulated signal, to determine the second communication data.

Optionally, in an embodiment of the present application, the current modulation module is configured to: modulate a value and/or an output frequency of the current signal provided by the first power signal terminal to obtain the first current signal.

Optionally, in an embodiment of the present application, the current modulation module is multiplexed as a first charging module; the communication control module is further configured to: send a charging instruction signal to the current modulation module when determining that the communication circuit is currently in a charging state according to the signal transmitted by the transmission interface; the current modulation module is further configured to: transmit a signal provided by the first power signal terminal to the transmission interface to output electric energy when receiving the charging instruction signal.

Optionally, in an embodiment of the present application, the current modulation module includes: a boost conversion circuit and a first switch transistor; the boost conversion circuit is electrically connected to the first power signal terminal, the transmission interface, the communication control module, and a data processor for providing the first communication data, respectively; a gate of the first switch transistor is electrically connected to the communication control module, a source of the first switch transistor is electrically connected to the transmission interface, and a drain of the first switch transistor is electrically connected to a second pull-down power supply.

Optionally, in an embodiment of the present application, the current modulation module includes: an error amplifier, a second switch transistor, a third switch transistor, and a current sense circuit; where a control terminal of the error amplifier is electrically connected to the communication control module, a first input terminal of the error amplifier is electrically connected to a first reference signal terminal and a first output terminal of a data processor for providing the first communication data respectively, a second input terminal of the error amplifier is electrically connected to a first terminal of the current sense circuit, and an output terminal of the error amplifier is electrically connected to a gate of the second switch transistor; a second terminal of the current sense circuit is electrically connected to the transmission interface, and a third terminal of the current sense circuit is electrically connected to the first power signal terminal; a source of the second switch transistor is electrically connected to the transmission interface, and a drain of the second switch transistor is electrically connected to the first power signal terminal; a gate of the third switch transistor is electrically connected to the communication control module, a source of the third switch transistor is electrically connected to the transmission interface, and a drain of the third switch transistor is electrically connected to a second pull-down power supply.

Optionally, in an embodiment of the present application, the current modulation module is multiplexed as a second charging module; the communication control module is further configured to: send a charging instruction signal to the current modulation module when determining that the communication circuit is currently in a charging state according to the signal transmitted by the transmission interface; the current modulation module is further configured to: transmit a charging signal received through the transmission interface to the first power signal terminal when receiving the charging instruction signal.

Optionally, in an embodiment of the present application, the current modulation module includes: an error amplifier, a fourth switch transistor, a fifth switch transistor, a sixth switch transistor, a seventh switch transistor, and a current sense circuit; where a control terminal of the error amplifier is electrically connected to the communication control module, a first input terminal of the error amplifier is electrically connected to a first reference signal terminal and a first output terminal of a data processor for providing the first communication data respectively, a second input terminal of the error amplifier is electrically connected to a first terminal of the current sense circuit, and an output terminal of the error amplifier is electrically connected to a gate of the fourth switch transistor; a second terminal of the current sense circuit is electrically connected to the transmission interface, and a third terminal of the current sense circuit is electrically connected to the first power signal terminal; a source of the fourth switch transistor is electrically connected to the transmission interface and a source of the sixth switch transistor respectively, and a drain of the fourth switch transistor is electrically connected to the first power signal terminal and a source of the seventh switch transistor respectively; a gate of the sixth switch transistor is electrically connected to the communication control module, and a drain of the sixth switch transistor is electrically connected to a well of the fourth switch transistor; a gate of the seventh switch transistor is electrically connected to the communication control module, and a drain of the seventh switch transistor is electrically connected to the well of the fourth switch transistor; a gate of the fifth switch transistor is electrically connected to the communication control module, a source of the fifth switch transistor is electrically connected to the transmission interface, and a drain of the fifth switch transistor is electrically connected to a second pull-down power supply.

Optionally, in an embodiment of the present application, the current demodulation module is further electrically connected to a first pull-down power supply and a second power signal terminal respectively, and is configured to: parse the received second communication signal sent by the transmission interface according to a first pull-down current provided by the first pull-down power supply and a second power signal provided by the second power signal terminal under control of the received demodulated signal, to determine the second communication data.

Optionally, in an embodiment of the present application, the current modulation module is configured to: modulate a value and/or an output frequency of the current signal provided by the first power signal terminal to obtain the first current signal; the current demodulation module is configured to: determine the second communication data according to a magnitude relationship in value and/or frequency between the second power signal provided by the second power signal terminal under control of the second communication signal and the first pull-down current.

Optionally, in an embodiment of the present application, the current demodulation module includes: an eighth switch transistor and a ninth switch transistor; a gate of the eighth switch transistor is electrically connected to the transmission interface, a source of the eighth switch transistor is electrically connected to the second power signal terminal, and a drain of the eighth switch transistor is electrically connected to a source of the ninth switch transistor; a gate of the ninth switch transistor is electrically connected to the communication control module, and a drain of the ninth switch transistor is electrically connected to the first pull-down power supply and a data processor for receiving the second communication data, respectively.

Optionally, in an embodiment of the present application, the communication control module includes a processor.

In a second aspect, an embodiment of the present application provides a communication system, the communication system including a first device and a second device, where each of the first device and the second device has a transmission interface, and a transmission interface of the first device is electrically connected to a transmission interface of the second device; the first device is configured to: modulate a parameter of a current signal to be processed according to communication data to be sent when determining to communicate with the second device, to obtain a first current signal and output the first current signal to the transmission interface, so that the transmission interface determines a communication signal according to the first current signal and outputs the communication signal to the second device; the second device is configured to: parse the communication signal received through the transmission interface to determine the communication data.

Optionally, in an embodiment of the present application, the first device is a charging device, and the second device is a charged device; or the first device is a charged device, and the second device is a charging device; the transmission interface is a charging interface.

Optionally, in an embodiment of the present application, the second device is configured to: parse the communication signal received through the transmission interface according to a preset first pull-down current and a second power signal provided by a second power signal terminal, to determine the communication data.

Optionally, in an embodiment of the present application, the first device is configured to: modulate a value and/or an output frequency of the current signal to be processed according to the communication data, to obtain the first current signal; the second device is configured to: determine the communication data according to a magnitude relationship in value and/or frequency between the second power signal provided by the second power signal terminal under control of the communication signal and the first pull-down current.

Optionally, in an embodiment of the present application, the first device and/or the second device includes the above-mentioned communication circuit provided in embodiments of the present application.

In a third aspect, an embodiment of the present application provides a communication method, the communication method is implemented by the above-mentioned communication system provided in embodiments of the present application; and the communication method includes: modulating, by a first device, a parameter of a current signal to be processed according to communication data to be sent when the first device determines to communicate with a second device, to obtain a first current signal and output the first current signal to a transmission interface, so that the transmission interface determines a communication signal according to the first current signal and outputs the communication signal to the second device; parsing, by the second device, the communication signal received through the transmission interface to determine the communication data.

The present application has following beneficial effects.

In the communication method, communication circuit and communication system provided in embodiments of the present application, the first device can modulate the parameter of the current signal to be processed according to the communication data to be sent, to form a communication signal and output the communication signal to the second device; and the second device can parse the communication signal to obtain the communication data. In this way, the communication interaction between the first device and the second device is realized, which can be applied to communication scenarios between various devices, improving the flexibility of communication and also expanding the application scope of the communication system and communication method.

Figure 1:
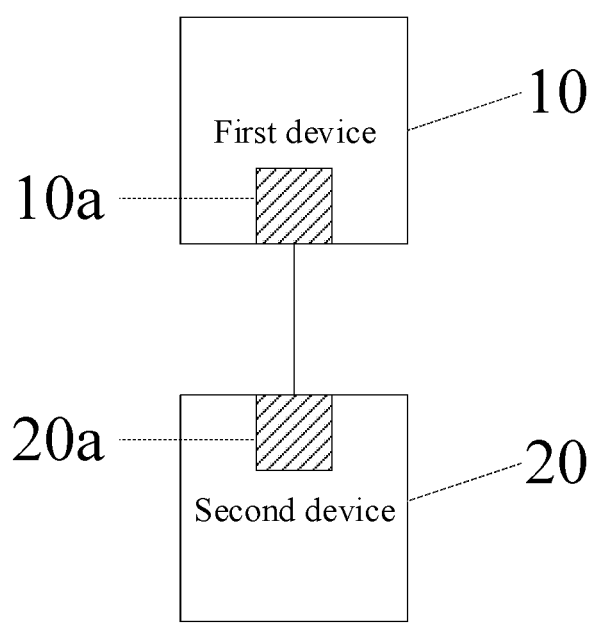
FIG. 1 is a structural schematic diagram of a communication system provided in an embodiment of the present application.

Numerical references in the drawings are as follow: 10—First device, 20—Second device, M—Communication circuit, 10a, 20a—Transmission interface, 11, 21—Communication control module, 12, 22—Current modulation module, 13, 23—Current demodulation module, 14, 24—Data processor, 11a, 21a—Processor, 11b, 21b—First comparator, 11c, 21c—Second comparator, 12a—Boost conversion circuit, 12b, 22a—Error amplifier, 12c, 22b—Current sense circuit.

DETAILED DESCRIPTION OF EMBODIMENTS

Specific implementations of a communication method, a communication circuit and a communication system provided in embodiments of the present application will be described in detail below with reference to the accompanying drawings. It is necessary to note that the described embodiments are only a part of embodiments of the present application, but not all embodiments. Based upon embodiments of the present application, all of other embodiments obtained by those ordinary skilled in the art without creative work pertain to the protection scope of the present application.

The inventors found in the research that the communication can be realized by multiplexing the charging interface at present in order to realize the communication between the charging device and the charged device. However, the method of multiplexing the charging interface to realize communication requires switching between the charging module and the communication module to realize switching between the charging function and the communication function, and there are many disadvantages and problems in term of the communication request and response.

For example, if the charging device is in the charging state, the charged device needs to wait for a long period of time when the charged device requests communication. The communication between the charging device and the charged device can be realized only when the charging device switches to the communication state after the charging device reaches the preset communication time. In this way, the time required for the charged device to determine whether to communicate or not is greatly increased, the power consumption of the charged device is increased, and thus the power consumption of the communication system is increased.

For another example, when the charging device requests to communicate with the charged device, the charging device needs to pull down the potential of the charging interface and keep for a certain period of time, so that the charged device determines that the charging device needs to establish communication with the charged device. However, this way of establishing communication may have following problems.

1. It is necessary to ensure that the charging voltage is at a high value when the charging device is charging the charged device, and the communication request can be triggered by adjusting the charging voltage. In this way, certain limitations will be imposed on the practical applications, which is not conducive to expansion of the applications.

2. If the charging voltage is always at a low value during the charging process, it is easy to cause one end to be communicated to continuously determine whether the other end is sending a communication request, thus increasing the power consumption of the end that continuously performs the determination, and then increasing the power consumption of the communication system.

Based on this, an embodiment of the present application provides a communication system, which can avoid the limitations on peripheral application and also facilitate reducing the power consumption when implementing communication through a charging interface.

An embodiment of the present application provides a communication system, as shown in FIG. 1, the communication system may include a first device 10 and a second device 20. Both the first device 10 and the second device 20 have transmission interfaces (e.g., 10a and 20a), and the transmission interface (such as 10a) of the first device 10 is electrically connected to the transmission interface (such as 20a) of the second device 20.

The first device 10 is configured to: modulate a parameter of a current signal to be processed according to communication data to be sent when determining to communicate with the second device 20, to obtain a first current signal and output the first current signal to the transmission interface, so that the transmission interface (such as 10a) determines a communication signal according to the first current signal and outputs the communication signal to the second device 20.

The second device 20 is configured to: parse the communication signal received through the transmission interface (such as 20a) to determine the communication data.

In this way, the communication interaction between the first device and the second device is realized, which can be applied to communication scenarios between various devices, improving the flexibility of communication and also expanding the application scope of the communication system and communication method.

Optionally, in an embodiment of the present application, the current signal to be processed may be provided by an internal first power signal terminal (such as a signal terminal shown by V1 in FIG. 2 later) or provided by an internal power module (not shown in the figure) capable of providing the current signal, as long as the current signal can be provided, which is not limited here.

Optionally, in an embodiment of the present application, the first device is a charging device, and the second device is a charged device; or the first device is a charged device, and the second device is a charging device.

The transmission interface is a charging interface.

That is to say, the communication system may also be multiplexed as a charging system, so that the communication system can realize not only communication but also charging, and thus the communication system has more abundant functions, expanding the application scope of the communication system.

The following description is given by taking the first device being the charging device and the second device being the charged device as an example.

During a specific implementation, in an embodiment of the present application, the second device may parse the communication signal using various approaches.

A first approach is as follows.

Optionally, the second device may perform high-pass filtering, shifting and shaping on the communication signal to parse out the communication data.

Here, for the specific processes, reference may be made to the related art, as long as the communication data can be parsed out through the above processing processes, which will not be described in detail here.

A second approach is as follows.

Optionally, the second device may perform ADC sampling on the communication signal to parse out the communication data.

Here, for the specific processes, reference may be made to the related art, as long as the communication data can be parsed out through the above processing processes, which will not be described in detail here.

A third approach is as follows.

Optionally, the second device may parse the communication signal through current modulation.

In an embodiment of the present application, the second device is configured to: parse the communication signal received through the transmission interface according to a preset first pull-down current and a second power signal provided by a second power signal terminal, to determine the communication data.

That is to say, not only the first device can obtain the communication signal by modulating the current, but also the second device can parse out the communication data from the communication signal by modulating the current.

Of course, in an actual situation, any one of the above approaches can be selected according to actual requirements when parsing the communication signal, to meet requirements of different application scenarios and improve the flexibility of design.

Optionally, in an embodiment of the present application, the first device is configured to: modulate a value and/or an output frequency of the current signal to be processed according to the communication data, to obtain the first current signal.

The second device is configured to: determine the communication data according to a magnitude relationship in value and/or frequency between the second power signal provided by the second power signal terminal under control of the communication signal and the first pull-down current.

Here, the value and/or output frequency of the current signal to be processed is modulated according to the communication data to be sent, to obtain the first current signal. The specific process may include following cases.

Case 1: the value of the current signal to be processed is modulated according to the communication data to be sent, to obtain the first current signal.

Taking the communication data to be sent (represented by Tdata) being a digital signal, i.e., a signal composed of 0 and 1, as an example, the specific process may include following situations.

If Tdata=1, a constant current with a value of A is formed. If Tdata=0, a constant current with a value of B is formed. Therefore, the first current signal sent to the transmission interface consists of a current with the value of A and a current with the value of B.

Furthermore, a constant second pull-down current needs to be set, for example, a value of the constant second pull-down current is C, and A>C>B is set, and the second pull-down current may also be sent to the transmission interface.

At this time, the transmission interface determines the communication signal according to the received first current signal and the second pull-down current. If the communication signal is a voltage signal, the specific process is as follows.

If Tdata=1, a first voltage V10 is output because the received current with the value of A is greater than the second pull-down current C; if Tdata=0, a second voltage V20 is output because the received current with the value of B is less than the second pull-down current C.

Therefore, according to the communication data to be output, under the control of the first device, a voltage signal (i.e., a communication signal) composed of the first voltage V10 and the second voltage V20 can be formed and sent to the second device to implement the communication process.

Of course, in an actual situation, if Tdata=1, a constant current value of B can also be formed, and correspondingly the second voltage V20 is output; if Tdata=0, a constant current value of A is formed, and correspondingly the first voltage V10 is output. As long as the communication signal can be obtained according to the communication data to be output, the corresponding relationship among the communication data, current value and voltage value can be selected and set according to actual requirements, which is not limited here.

Case 2: the output frequency of the current signal to be processed is modulated according to the communication data to be sent, to obtain the first current signal.

Taking the communication data to be sent (represented by Tdata) being a digital signal, i.e., a signal composed of 0 and 1, as an example, the specific process may include following situations.

If Tdata=1, a current with an output frequency of H is formed. If Tdata=0, a current with an output frequency of L is formed. Therefore, the first current signal sent to the transmission interface consists of the current with the output frequency of H and the current with the output frequency of L.

At this time, the transmission interface determines the communication signal according to the received first current signal. If the communication signal is a voltage signal, the specific process is as follows.

If Tdata=1, the first voltage V10 is output because the current with the output frequency of H is received; if Tdata=0, the second voltage V20 is output because the current with the output frequency of L is received.

Therefore, according to the communication data to be output, under the control of the first device, a voltage signal (i.e., a communication signal) composed of the first voltage V10 and the second voltage V20 can be formed and sent to the second device to implement the communication process.

Of course, in an actual situation, if Tdata=1, a current with an output frequency of L can also be formed, and correspondingly the second voltage V20 is output; if Tdata=0, a current with an output frequency of H is formed, and correspondingly the first voltage V10 is output. As long as the communication signal can be obtained according to the communication data to be output, the corresponding relationship among the communication data, output frequency and voltage value can be selected and set according to actual requirements, which is not limited here.

Case 3: the value and output frequency of the current signal to be processed is modulated according to the communication data to be sent, to obtain the first current signal.

Taking the communication data to be sent (represented by Tdata) being a digital signal, i.e., a signal composed of 0 and 1, as an example, the specific process may include following situations.

If Tdata=1, a constant current with a value of A and an output frequency of H is formed. If Tdata=0, a constant current with a value of B and an output frequency of L is formed. Therefore, the first current signal sent to the transmission interface consists of two above-mentioned constant currents.

At this time, the transmission interface determines the communication signal according to the received first current signal. If the communication signal is a voltage signal, the specific process is as follows.

If Tdata=1, the first voltage V10 is output because the constant current with the value of A and the output frequency of H is received; if Tdata=0, the second voltage V20 is output because the constant current with the value of B and the output frequency of L is received.

Therefore, according to the communication data to be output, under the control of the first device, a voltage signal (i.e., a communication signal) composed of the first voltage V10 and the second voltage V20 can be formed and sent to the second device to implement the communication process.

Of course, in an actual situation, if Tdata=1, a constant current with a value of A and an output frequency of H can also be formed, and correspondingly the second voltage V20 is output; if Tdata=0, a constant current with a value of B and an output frequency of L is formed, and correspondingly the first voltage V10 is output. As long as the communication signal can be obtained according to the communication data to be output, the corresponding relationship among the communication data, current value plus output frequency and voltage value can be selected and set according to actual requirements, which is not limited here.

In conclusion, in actual situations, when the first current signal is formed, any one of three above-mentioned cases can be selected and set according to actual requirements, to meet the requirements of different application scenarios and improve the flexibility of design.

Correspondingly, when the second device parses the communication signal according to the communication protocol, the process may be as follows.

If the first current signal is modulated as in the above-mentioned case 1, the communication data may be parsed out according to the magnitude relationship in value between the second power signal that can be provided by the second power signal terminal under the control of the communication signal and the first pull-down current when parsing the communication signal.

For example but not limited to, when the second power signal provided by the second power signal terminal under the control of the communication signal is less than the first pull-down current, a digit 1 may be parsed out; when the second power signal provided by the second power signal terminal under the control of the communication signal is not less than the first pull-down current, a digit 0 may be parsed out.

Alternatively, when the second power signal provided by the second power signal terminal under the control of the communication signal is less than the first pull-down current, a digit 0 may be parsed out; when the second power signal provided by the second power signal terminal under the control of the communication signal is not less than the first pull-down current, a digit 1 may be parsed out.

The communication data can be determined through the above parsed-out digits 1 and 0.

Here, the second power signal can be understood as follows.

Taking FIG. 3 introduced later as an example, the second power signal terminal is VCC, and the second power signal is a current flowing through the eighth switch transistor k8 under the control of the communication signal.

Alternatively, if the first current signal is modulated as in the above-mentioned case 2, the communication data may be parsed out according to the magnitude relationship in frequency between the second power signal that can be provided by the second power signal terminal under the control of the communication signal and the first pull-down current when parsing the communication signal.

The specific parsing process is similar to the above parsing process based on the value, except that the frequencies are compared instead of values in this case (that is, the first pull-down current provided by the first pull-down power supply may be set as a signal that changes in frequency and/or value according to actual demands), and the specific process will not be described in detail here.

Alternatively, if the first current signal is modulated as in the above-mentioned case 3, the communication data may be parsed out according to the magnitude relationship in value and frequency between the second power signal that can be provided by the second power signal terminal under the control of the communication signal and the first pull-down current when parsing the communication signal.

Therefore, the communication signal may be parsed in a way corresponding to the current modulation way, to determine the communication data quickly and accurately, complete the transmission of the communication data, and realize the communication between the first device and the second device.

Figure 2:
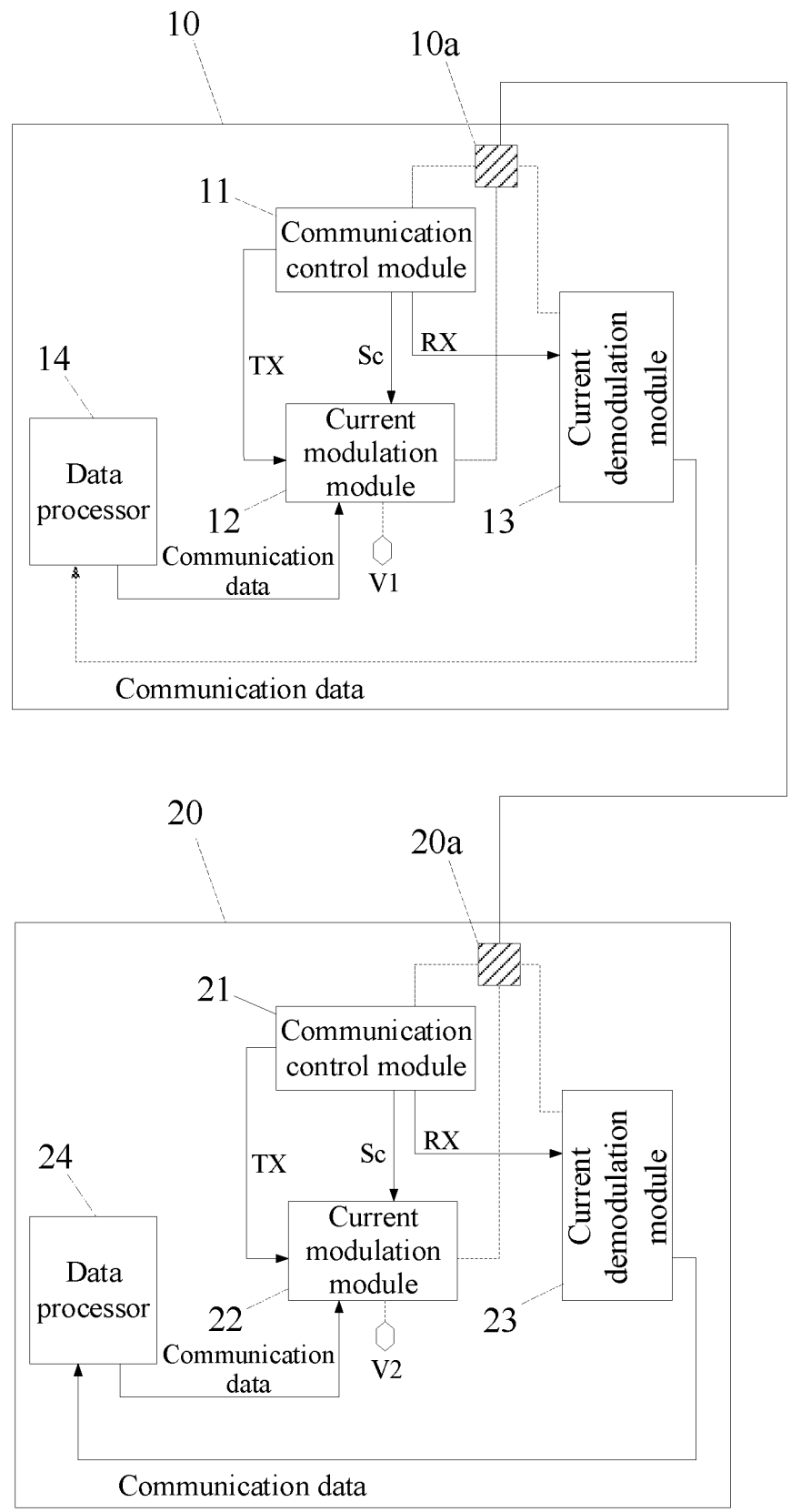
FIG. 2 is a structural schematic diagram of another communication system provided in an embodiment of the present application.

During a specific implementation, in an embodiment of the present application, as shown in FIG. 2, the first device 10 and/or the second device 20 include: a communication control module (such as 11 or 21), a current modulation module (such as 12 or 22), and a current demodulation module (such as 13 or 23).

The communication control module (such as 11 or 21) is electrically connected to a transmission interface (such as 10a or 20a), the current modulation module (such as 12 or 22) and the current demodulation module (such as 13 or 23) respectively, and is configured to: send a modulation signal to the current modulation module (such as 12 or 22) when determining that the device where the communication control module is located is currently in a communication state and the device where the communication control module is located is currently the sender of the communication data according to the signal transmitted by the transmission interface (such as 10a or 20a); or send a demodulation signal to the current demodulation module (such as 13 or 23) when determining that the device where the communication control module is located is currently in the communication state and the device where the communication control module is located is currently the receiver of the communication data according to the signal transmitted by the transmission interface (such as 10a or 20a).

The current modulation module (such as 12 or 22) is further electrically connected to the transmission interface (such as 10a or 20a) and a first power signal terminal (such as V1 or V2) respectively, and is configured to: modulate a parameter of a current signal provided by the first power signal terminal (such as V1 or V2) according to the communication data under control of the received modulation signal, to obtain a first current signal and send the first current signal to the transmission interface (such as 10a or 20a).

The current demodulation module (such as 13 or 23) is further electrically connected to the transmission interface (such as 10a or 20a), and is configured to: parse a communication signal received through the transmission interface under control of the received demodulated signal, to determine the communication data.

To illustrate, FIG. 2 only shows the situation in which each of the first device 10 and the second device 20 includes a communication control module, a current modulation module and a current demodulation module, but the following setting ways are possible in practical situations.

1. Only the first device includes a communication control module, a current modulation module and a current demodulation module, not shown in the figure.

2. Only the second device includes a communication control module, a current modulation module and a current demodulation module, not shown in the figure.

3. Each of the first device and the second device includes a communication control module, a current modulation module and a current demodulation module, as shown in FIG. 2.

That is to say, in actual situations, specific structures of the first device and the second device may be set in any one of the three above-mentioned ways according to actual requirements, to meet the requirements of different application scenarios and improve the flexibility of design.

Thus, through the cooperation among the communication control module, the current modulation module and the current demodulation module, the parameter of the current signal to be output can be modulated to finally determine the communication signal. Simultaneously, the communication signal may be parsed under the control of the demodulation signal to obtain the communication data, thereby realizing the communication between the first device and the second device.

Also, through the communication control module, when either party sends a communication request (which may be a specific voltage signal negotiated in advance according to the communication protocol), it is beneficial to complete the communication handshake quickly, avoid the long waiting time when the communication is required, and also help to reduce the power consumption of the device, thereby improving the efficiency of communication.

Optionally, in an embodiment of the present application, the communication control module is further configured to: send a charging instruction signal to the current modulation module and the current demodulation module respectively, or prohibit from sending the modulation signal to the current modulation module and prohibit from sending the demodulation signal to the current demodulation module, when determining that the device where the communication control module is located is currently in a charging state, so that: the current modulation module prohibits from sending the first current signal to the transmission interface when receiving the charging instruction signal, and the current demodulation module prohibits from outputting the communication data to the data processor when receiving the charging instruction signal.

Here, when determining the current state of the device where the communication control module is located, the communication control module may perform determination by: determining expression forms of signals such as communication request signal, communication signal and charging signal (for example, but not limited to, values of signals) according to the communication protocol negotiated in advance by the first device and the second device, to complete the determination of the state; or, performing determination according to maintenance time of a specific signal (for example, but not limited to, a signal with a specific value) negotiated in advance by the first device and the second device.

Moreover, when determining that the current state is the communication state, the communication data sender and the communication data receiver may also be pre-determined according to the communication protocol negotiated in advance.

That is to say, the current state of the device where the communication control module is located can be determined through the communication control module, that is, whether the device where the communication control module is located is currently in the charging state or communication state is determined. If the device where the communication control module is located is in the charging state, the current modulation module can be instructed to prohibit from outputting the first current signal, and the current demodulation module can be instructed to prohibit from outputting the communication data; if the device where the communication control module is located is in the communication state, the current modulation module can be controlled to output the first current signal, and the current demodulation module can be controlled to output the communication data.

To illustrate, if the first device wants to communicate with the second device, the first device can firstly send a communication request signal to the second device. The second device sends a feedback signal to the first device after receiving the communication request signal. When the first device receives the feedback signal, this means that the communication handshake between the first device and the second device is successful, and the communication can be started.

If the communication handshake is unsuccessful, the communication request signal always exists, so the above communication handshake process can be repeated until the communication handshake is successful.

Here, the expression forms of the communication request signal and the feedback signal can be similar to the expression form of the communication signal mentioned in the above. Of course, other forms of signals (for example, but not limited to, a signal with a specific voltage) may be possible, as long as the communication handshake process can be implemented, which is not limited here.

In this way, the current state of the device where the communication control module is located can be determined through the communication control module, to facilitate switching between the communication process and the charging process, and ensure that both the communication process and the charging process can be performed normally and effectively.

Figure 3:
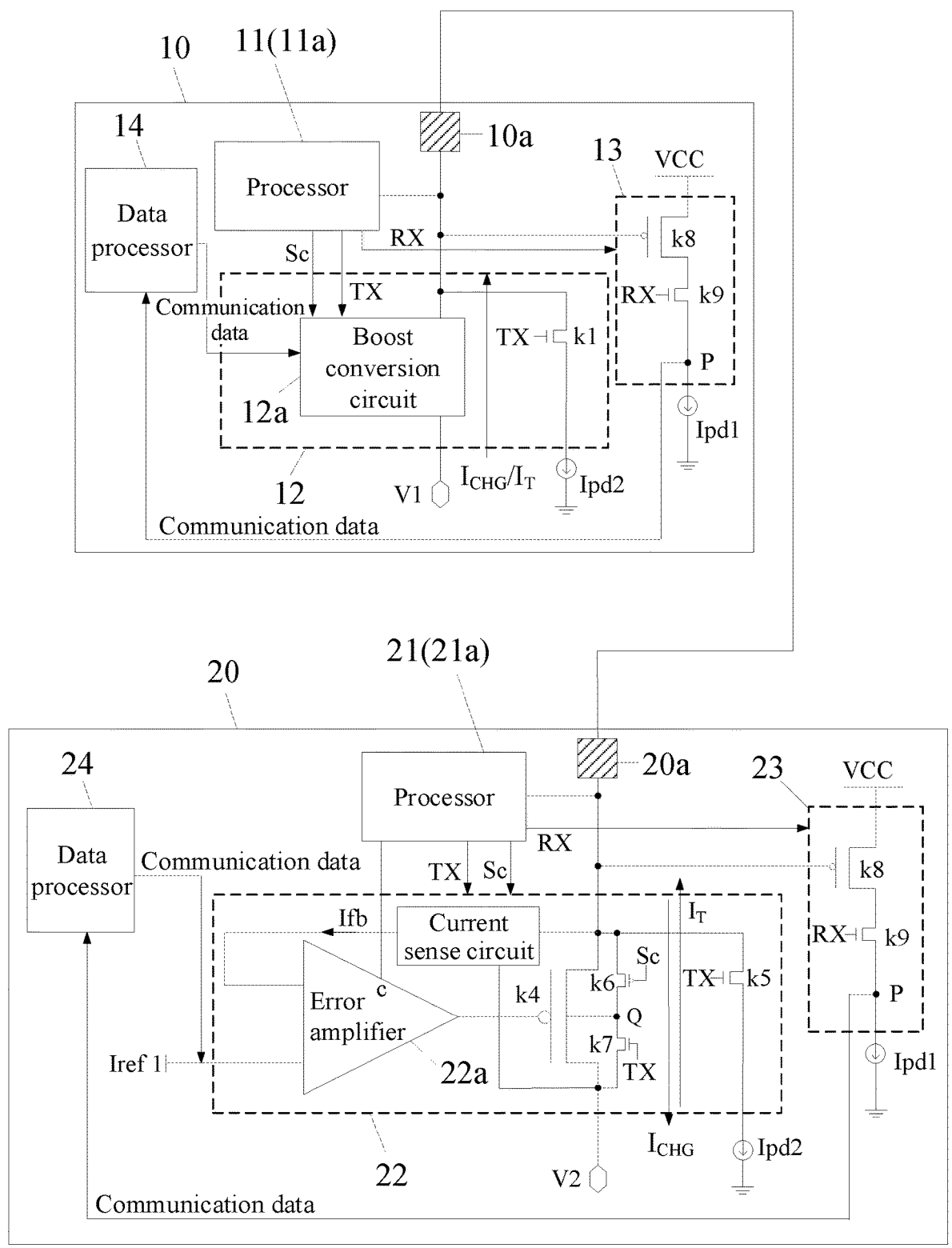
FIG. 3 is a structural schematic diagram of yet another communication system provided in an embodiment of the present application.
Figure 4:
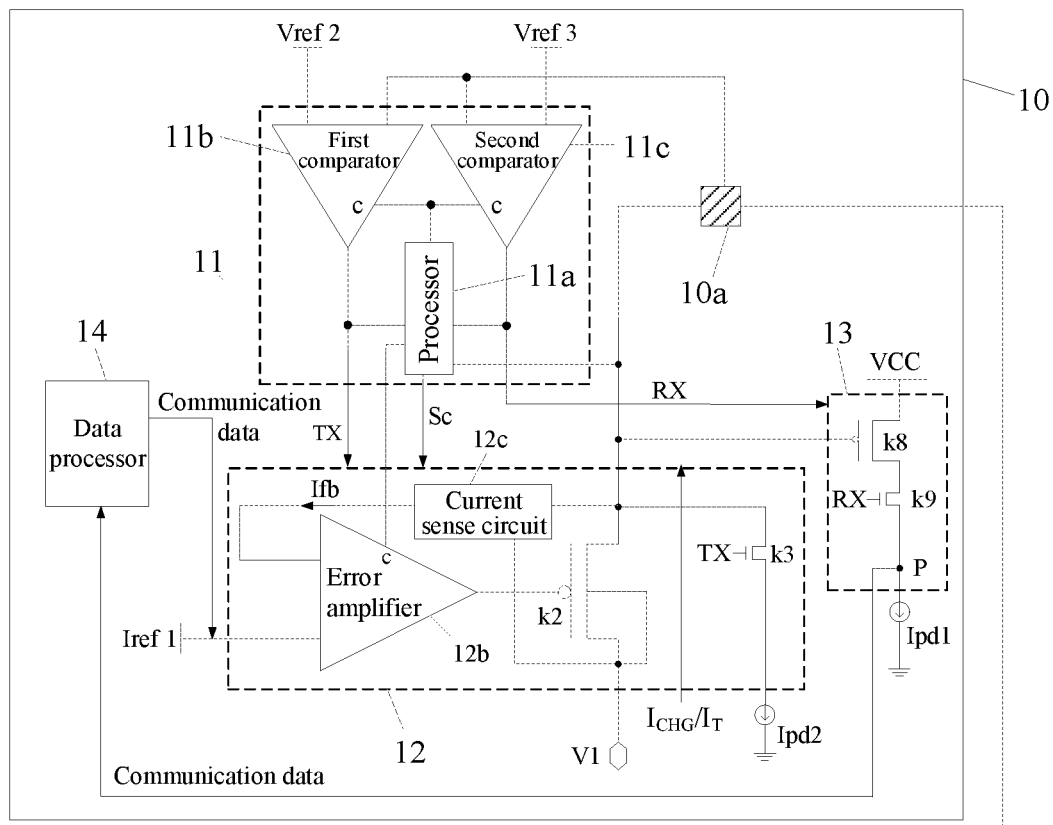
FIG. 4 is a structural schematic diagram of yet another communication system provided in an embodiment of the present application.
Figure 4:
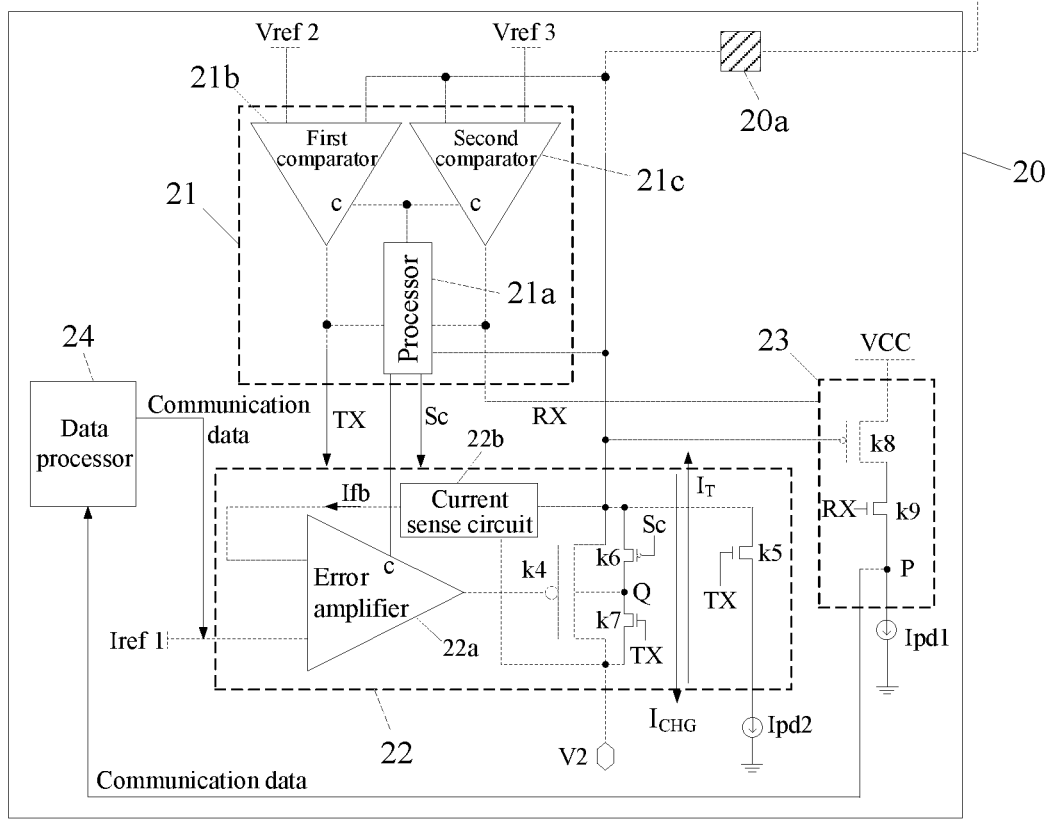

During a specific implementation, in an embodiment of the present application, as shown in FIG. 3 and FIG. 4, regardless of the communication control module (such as 11) in the charging device 10 or the communication control module (such as 21) in the charged device 20, the structures of the communication control modules may be set to be the same, to simplify the structure of the communication system and reduce the manufacturing cost of the communication system.

Of course, in an actual situation, the structures of the communication control modules in the two devices may also be set to be different (not shown in the figure), and may be set according to the actual requirements to meet the requirements of different application scenarios, which is not limited here.

The structure of the communication control module may be set using following approaches.

A first approach is as follows.

Optionally, the communication control module (such as 11 or 21) may include a processor, as shown in FIG. 3.

In this way, the function of the communication control module can be realized through a simple structure, which is beneficial to simplify the structure of the first device and/or the second device and reduce the manufacturing cost of the device.

A second approach is as follows.

Optionally, as shown in FIG. 4, the communication control module (such as 11 or 21) may include: a processor (such as 11a or 21a), a first comparator (such as 11b or 21b) and a second comparator (such as 11c or 21c).

The processor (such as 11a or 21a) is electrically connected to a control end c of the first comparator (such as 11b or 21b), a control end c of the second comparator (such as 11c or 21c), the current modulation module (such as 12 or 22), the current demodulation module (such as 13 or 23) and the transmission interface (such as 10a or 20a), respectively.

A first input terminal of the first comparator (such as 11b or 21b) is electrically connected to a second reference signal terminal (such as Vref 2), a second input terminal of the first comparator is electrically connected to the transmission interface (such as 10a or 20a), and an output terminal of the first comparator is electrically connected to the current modulation module (such as 12 or 22) and the current demodulation module (such as 13 or 23), respectively.

A first input terminal of the second comparator (such as 11c or 21c) is electrically connected to a third reference signal terminal (such as Vref 3), a second input terminal of the second comparator is electrically connected to the transmission interface (such as 10a or 20a), and an output terminal of the second comparator is electrically connected to the current modulation module (such as 12 or 22) and the current demodulation module (such as 13 or 23), respectively.

Here, the processor may be configured to determine the current state of the device where the processor is located. When determining that the device where the processor is located is currently in the charging state, the processor, on the one hand, inputs a non-enable signal to the first comparator and the second comparator to prohibit the first comparator and the second comparator from outputting any signal, and on the other hand, outputs a charging instruction signal to the current modulation module and the current demodulation module to prohibit the current modulation module from outputting the first current signal to the transmission interface and prohibit the current demodulation module from demodulating the communication signal, so that the device where the processor is located is currently in the charging state and completes the charging process.

When the processor determines that the device where the processor is located is currently in the communication state and is a communication data sender, the processor, on the one hand, inputs a non-enable signal to the first comparator and the second comparator to prohibit the first comparator and the second comparator from outputting any signal, and on the other hand, outputs a modulation signal to the current modulation module, so that the current modulation module outputs the first current signal to the transmission interface.

When the processor determines that the device where the processor is located is currently in the communication state and is a communication data receiver, the processor, on the one hand, prohibits from outputting any signal to the current modulation module and the current demodulation module, and on the other hand, inputs an enable signal to the first comparator and the second comparator, so that the first comparator and the second comparator control the current demodulation module to parse the communication signal to complete the communication process.

In this way, not only can the current state of the device where the processor is located can be determined, to determine whether the charging process or the communication process between the charging device and the charged device is performed to ensure that the communication process and the charging process can be carried out normally and effectively, but it can also be beneficial to reduce the calculation amount of the processor, thus helping to reduce the manufacturing cost of the processor and thereby reducing the manufacturing cost of the device.

Of course, the specific structure of the communication control module is not limited to those shown in FIG. 3 and FIG. 4, and may also be other structure known to those skilled in the art, which, for example but not limited to, includes a processor and a comparator and outputs the charging instruction signal, the modulation signal and the demodulation signal in different time periods, which is not limited here, as long as the function of the communication control module can be realized.

In an embodiment of the present application, the current modulation module may be set according to different functions of the device where the communication control module is located using following approaches.

A first approach is as follows.

Optionally, in an embodiment of the present application, the charging device includes a current modulation module and a communication control module, and the current modulation module is multiplexed as a first charging module.

The communication control module in the charging device is further configured to: send a charging instruction signal to the current modulation module when determining that the device where the communication control module is located is currently in the charging state according to the signal transmitted by the transmission interface.

The current modulation module in the charging device is further configured to: transmit a signal provided by the first power signal terminal to the transmission interface to output electric energy to the charged device when receiving the charging instruction signal.

That is to say, there is a need for the charging device to provide the electrical energy to the charged device to charge the charged device, so the current modulation module can be multiplexed as the first charging module. At this time, the current modulation module can not only output the modulated first current signal to the transmission interface to facilitate the communication with the charged device, but also output a second current signal to the transmission interface to facilitate charging the charged device.

Therefore, by setting the current modulation module, the structure of the charging device can be simplified on the basis of realizing the communication between the charging device and the charged device through the transmission interface, thereby reducing the manufacturing cost of the charging device and thus reducing the manufacturing cost of the communication system.

In an embodiment of the present application, the setting of the specific structure of the current modulation module in the charging device may include following types.

A first type is as follows.

Optionally, in an embodiment of the present application, as shown in FIG. 3, the current modulation module 12 in the charging device 10 includes: a boost conversion circuit 12a and a first switch transistor k1.

The boost conversion circuit 12a is electrically connected to the first power signal terminal V1, the transmission interface 10a, the communication control module 11, and the data processor 14 for providing the communication data, respectively.

A gate of the first switch transistor k1 is electrically connected to the communication control module 11, a source the first switch transistor k1 is electrically connected to the transmission interface 10a, and a drain the first switch transistor k1 is electrically connected to a second pull-down power supply Ipd2.

In this way, the function of the current modulation module in the charging device can be realized by using fewer elements, which can not only realize the current modulation for communication but also provide a second current signal for charging, and at the same time, can also be beneficial to simplify the structure of the current modulation module, reduce the manufacturing cost of the current modulation module, and thus reduce the manufacturing cost of the charging device.

A second type is as follows.

Optionally, in an embodiment of the present application, as shown in FIG. 4, the current modulation module 12 in the charging device 10 includes: an error amplifier 12b, a second switch transistor k2, a third switch transistor k3, and a current sense circuit 12c.

A control terminal c of the error amplifier 12b is electrically connected to the communication control module 11, a first input terminal of the error amplifier 12b is electrically connected to a first reference signal terminal Iref 1 and a first output terminal of the data processor 14 for providing the communication data respectively, a second input terminal of the error amplifier 12b is electrically connected to a first terminal of the current sense circuit 12c, and an output terminal of the error amplifier 12b is electrically connected to a gate of the second switch transistor k2.

A second terminal of the current sense circuit 12c is electrically connected to the transmission interface 10a, and a third terminal of the current sense circuit 12c is electrically connected to the first power signal terminal V1.

A source of the second switch transistor k2 is electrically connected to the transmission interface 10a, and a drain of the second switch transistor k2 is electrically connected to the first power signal terminal V1.

A gate of the third switch transistor k3 is electrically connected to the communication control module 11, a source of the third switch transistor k3 is electrically connected to the transmission interface 10a, and a drain of the third switch transistor k3 is electrically connected to a second pull-down power supply Ipd2.

To illustrate, in practice, the first input terminal and the second input terminal of the error amplifier may also be set as follows.

The first input terminal of the error amplifier is electrically connected to the first reference signal terminal Iref 1, and the second input terminal of the error amplifier is electrically connected to the first terminal of the current sense circuit 12c and the second output terminal of the data processor 14 respectively, not shown in the figure.

At this time, the communication data output by the data processor 14 can be applied to the second input terminal of the error amplifier.

Alternatively, the first input terminal of the error amplifier is electrically connected to the first reference signal terminal Iref 1 and the first output terminal of the data processor 14 for providing the communication data respectively, and the second input terminal of the error amplifier is electrically connected to the first terminal of the current sense circuit 12c and the second output terminal of the data processor 14 respectively, not shown in the figure.

At this time, the communication data output by the data processor 14 can be applied to the first input terminal and the second input terminal of the error amplifier, respectively.

In this way, the function of the current modulation module in the charging device can be realized by using simple element settings, which can not only realize the current modulation for communication but also provide a second current signal for charging, and at the same time, can also be beneficial to simplify the structure of the current modulation module, reduce the manufacturing cost of the current modulation module, and thus reduce the manufacturing cost of the charging device.

Of course, the specific structure of the current modulation module in the charging device is not limited to those shown in FIG. 3 and FIG. 4, and can also be other structure known to those skilled in the art, which is not limited here, as long as the function of the current modulation module can be realized.

Moreover, in actual situations, when the current modulation module in the charging device is set, any one of the above ways can be selected according to actual requirements, to meet the requirements of different application scenarios and improve the flexibility of design.

A second approach is as follows.

Optionally, in an embodiment of the present application, the charged device includes a communication control module and a current modulation module, and the current modulation module is multiplexed as a second charging module.

The communication control module in the charged device is further configured to: send a charging instruction signal to the current modulation module when determining that the device where the communication control module is located is currently in the charging state according to the signal transmitted by the transmission interface.

The current modulation module in the charged device is further configured to: transmit a charging signal received through the transmission interface to the first power signal terminal when receiving the charging instruction signal.

That is to say, there is a need for the charged device to receive the electric energy provided by the charging device for charging, so the current modulation module can be multiplexed as the second charging module. At this time, the current modulation module can not only output the modulated first current signal to the transmission interface to facilitate the communication with the charging device, but also transmit the charging signal received through the transmission interface to the internal first power signal terminal to complete the charging process.

Therefore, by setting the current modulation module, the structure of the charged device can be simplified on the basis of realizing the communication between the charging device and the charged device through the transmission interface, thereby reducing the manufacturing cost of the charged device and thus reducing the manufacturing cost of the communication system.

Optionally, in an embodiment of the present application, as shown in FIG. 3 and FIG. 4, the current modulation module 22 in the charged device 20 includes: an error amplifier 22a, a fourth switch transistor k4, a fifth switch transistor k5, a sixth switch transistor k6, a seventh switch transistor k7, and a current sense circuit 22b.

A control terminal c of the error amplifier 22a is electrically connected to the communication control module 21, a first input terminal of the error amplifier 22a is electrically connected to a first reference signal terminal Iref1 and a first output terminal of a data processor 24 for providing the communication data respectively, a second input terminal of the error amplifier 22a is electrically connected to a first terminal of the current sense circuit 22b, and an output terminal of the error amplifier 22a is electrically connected to a gate of the fourth switch transistor k4.

A second terminal of the current sense circuit 22b is electrically connected to the transmission interface 20a, and a third terminal the current sense circuit 22b is electrically connected to the first power signal terminal V2.

A source of the fourth switch transistor k4 is electrically connected to the transmission interface 20a and a source of the sixth switch transistor k6 respectively, and a drain of the fourth switch transistor k4 is electrically connected to the first power signal terminal V2 and a source of the seventh switch transistor k7 respectively.

A gate of the sixth switch transistor k6 is electrically connected to the communication control module 21, and a drain of the sixth switch transistor k6 is electrically connected to a well (such as Q) of the fourth switch transistor k4.

A gate of the seventh switch transistor k7 is electrically connected to the communication control module 21, and a drain of the seventh switch transistor k7 is electrically connected to the well (such as Q) of the fourth switch transistor k4.

A gate of the fifth switch transistor k5 is electrically connected to the communication control module 21, a source of the fifth switch transistor k5 is electrically connected to the transmission interface 20a, and a drain of the fifth switch transistor k5 is electrically connected to a second pull-down power supply Ipd2.

Here, types of the fourth switch transistor to the seventh switch transistor can be set according to actual situations, as long as the function of the current modulation module in the charged device can be realized. The types of the fourth switch transistor to the seventh switch transistor are not limited here.

Also, for the setting mode of the error amplifier, reference may be made to the setting mode of the error amplifier mentioned in the above, which will not be described in detail here.

In this way, the function of the current modulation module in the charged device can be realized by using simple elements, which can not only realize the current modulation for communication but also transmit the charging signal to the first power signal terminal, and at the same time, can also be beneficial to simplify the structure of the current modulation module, reduce the manufacturing cost of the current modulation module, and thus reduce the manufacturing cost of the charged device.

Of course, the specific structure of the current modulation module in the charged device is not limited to those shown in FIG. 3 and FIG. 4, and can also be other structure known to those skilled in the art, which is not limited here, as long as the function of the current modulation module can be realized.

In short, in actual situations, regardless of the charging device or the charged device, the above-mentioned first or second approach can be selected for setting according to actual requirements when the current modulation module is fabricated, to meet the requirements of different application scenarios and improve the flexibility of design.

During a specific implementation, in an embodiment of the present application, the current demodulation module is further electrically connected to a first pull-down power supply and a second power signal terminal respectively, and is configured to: parse the received communication signal sent by the transmission interface according to a first pull-down current provided by the first pull-down power supply and a second power signal provided by the second power signal terminal under control of the received demodulated signal, to determine the communication data.

Therefore, the current demodulation module can parse out the communication data from the communication signal by modulating the current, to realize the transmission of the communication data.

Optionally, in an embodiment of the present application, as shown in FIG. 3 and FIG. 4, the current demodulation module 13 in the charging device 10 or the current demodulation module 23 in the charged device 20 may include: an eighth switch transistor k8 and a ninth switch transistor k9.

A gate of the eighth switch transistor k8 is electrically connected to the transmission interface (such as 10a or 20a), a source of the eighth switch transistor k8 is electrically connected to the second power signal terminal VCC, and a drain of the eighth switch transistor k8 is electrically connected to a source of the ninth switch transistor k9.

A gate of the ninth switch transistor k9 is electrically connected to the communication control module (such as 11 or 21), and a drain of the ninth switch transistor k9 is electrically connected to the first pull-down power supply Ipd1 and a data processor (such as 14 or 24) for providing the communication data, respectively.

In this way, the function of the current demodulation module can be realized by simple structure settings, implementing the current demodulation to obtain the communication data and complete the communication process, and at the same time, it is also beneficial to simplify the structure of the current demodulation module, reduce the manufacturing cost of the current demodulation module, and thus reduce the manufacturing cost of the communication system.

Of course, the specific structure of the current demodulation module is not limited to those shown in FIG. 3 and FIG. 4, and can also be other structure known to those skilled in the art, which is not limited here, as long as the function of the current demodulation module can be realized.

Optionally, the specific structure of the data processor is not limited in embodiments of the present application, and any structure capable of realizing the function of the data processor belongs to the protection scope of embodiments of the present application.

The working process of the communication system will be introduced and described below with reference to the structures shown in FIG. 3 and FIG. 4.

1. The structure shown in FIG. 3 is taken as an example where the first device is a charging device and the second device is a charged device.

1.1 A charging process is as follows.

Charging device 10: when determining that the charging device is currently in the charging state, the processor 11a sends a charging instruction signal (eg, Sc=1) to the boost conversion circuit 12a, so that the boost conversion circuit 12a can boost the voltage provided by the first power signal terminal V1 and then output the boosted voltage to the transmission interface 10a to form a charging signal; due to being currently in the charging state, the processor 11a can control the first switch transistor k1 to be in the off state, to prohibit from outputting the second pull-down current provided by the second pull-down power supply Ipd2 to the transmission interface 10a; and at this time, the transmission interface 10a transmits the charging signal to the charged device 20.

Charged device 20: the processor 21a determines that charging is required at this time according to the communication protocol and the received charging signal, so the processor outputs a charging instruction signal to the gate of the sixth switch transistor k6 (if the sixth switch transistor k6 is an N-type transistor, the charging instruction signal is a high-level signal, that is, Sc=1) to close the sixth switch transistor k6, so that the well Q of the fourth switch transistor k4 is electrically connected to the transmission interface 20a; and at the same time, the processor 21a inputs the charging indication signal (that is, Sc=1) to the control terminal c of the error amplifier 22a, so that the error amplifier 22a can control the on state of the fourth switch transistor k4 according to a feedback current (such as Ifb, and at the same time, the feedback current may be, but not limited to, the current flowing through the fourth switch transistor k4) output by the current sense circuit and a first reference current provided by the first reference signal terminal Iref 1, to transmit the charging signal input through the transmission interface 20a to the first power signal terminal V2 to realize the charging process.

1.2 A communication process is as follows.

1.2.1 The charging device 10 is the sender of the communication data, and the charged device 20 is the receiver of the communication data.

Since the charging device 10 is the sender of the communication data, the charging device 10 is in the communication state at this time, while the charged device 20 may be in the charging state or in the communication state at this time. Thus, there is a need to illustrate based on different cases.

1.2.1.1 The charged device 20 is currently in the charging state.

At this time, the charging device 10 needs to establish a communication connection with the charged device 20, that is, the charging device 10 needs to inform the charged device 20 that the communication is required, so the charging device 10 needs to send a communication request signal to the charged device 20 at first. After the charging device 10 receives a feedback from the charged device 20, the charging device 10 sends a communication signal representing the communication data to the charged device 20.

Here, for the charging device 10, the stage of sending the communication request signal is as follows.

The processor 11a sends a modulation signal (e.g., TX=1) to the gate of the first switch transistor k1 (assuming that the first switch transistor k1 is an N-type transistor) to close the first switch transistor k1, and outputs a second pull-down current (e.g., the current value is C) provided by the second pull-down power supply Ipd2 to the transmission interface; and at the same time, the processor sends the modulation signal (e.g., TX=1) to the boost conversion circuit 12a, so that the processor outputs a constant current with a value of B to the transmission interface 10a. If B is less than C, the transmission interface 10a can form a specific voltage signal (this signal may be understood as a signal corresponding to the modulated current signal IT), and the specific voltage signal may be sent to the charged device 20 as the communication request signal.

To illustrate, in actual situations, the form of the communication request signal may be a low-level signal with a specific duration, or a pulse signal with a specific frequency, or a pulse signal with a specific duration and a specific frequency, etc., and may be set according to actual requirements. These signals here are just examples for illustration, and the form is not limited here.

For the charged device 20, when receiving the communication request signal: the processor 21a can determine, according to the preset communication protocol, that the charging device 10 wants to communicate with the device where the processor 21a is located (i.e., the charged device 20), so the processor 21a can control the fifth switch transistor k5, the sixth switch transistor k6 and the seventh switch transistor k7 to be in the off state; and at the same time, the processor 21a can send a control signal to the control terminal c of the error amplifier 22a so that the error amplifier 22a has no signal, to control the fourth switch transistor k4 to be turned off, that is, the charged device 20 temporarily ends the charging process, that is, the charged device 20 provides feedback to the charging device 10 by reducing loads.

Of course, when the charged device 20 provides feedback to the charging device 10, the feedback method used is not limited to reducing loads. A specific signal sent by the charged device 20 to the charging device 10 according to the communication protocol is also possible, as long as the signal can be fed back to the charging device 10 for communication. The feedback method is only exemplified here, and is not limited.

For the charging device 10, since the charged device 20 temporarily ends the charging process, the case when the processor 11a in the charging device 10 detects the relatively small load through the transmission interface 10a means that the charged device 20 is ready to communicate with the charging device 10. Therefore, the charging device 10 can send a communication signal to the charged device 20 at this time, and the specific process is as follows.

The processor 11a continues to send the modulation signal (e.g., TX=1) to the gate of the first switch transistor k1 (assuming that the first switch transistor k1 is an N-type transistor) so that the first switch transistor k1 continues remaining closed, and outputs a second pull-down current (e.g., the current value is C) provided by the second pull-down power supply Ipd2 to the transmission interface; and at the same time, the processor 11a sends the modulation signal (e.g., TX=1) to the boost conversion circuit 12a, so that a constant current with a value of A is output to the transmission interface 10a when the communication data to be sent is 1, and a constant current with a value of B is output to the transmission interface 10a when the communication data to be sent is 0. If A is greater than C, the transmission interface 10a determines a first voltage; if B is greater than C, the transmission interface 10a determines a second voltage. At this time, the transmission interface 10a can form a communication signal composed of the first voltage and the second voltage, and send the communication signal to the charged device 20.

Of course, the form of the communication signal is not limited to the above-mentioned form, and the communication signal can also be formed in the way of the Case 2 or Case 3 mentioned above when modulating the current signal. As long as a specific signal can be formed by modulating the current signal, the specific form of the communication signal is not limited here.

For the charged device 20, when receiving the communication signal: the processor 21a can determine, according to the preset communication protocol, that the communication signal is a signal for representing the communication data to be sent, so a demodulation signal (that is, RX=1) can be input to the gate of the ninth switch transistor k9. When the ninth switch transistor k9 is an N-type transistor, the ninth switch transistor k9 is turned on, so that the drain of the eighth switch transistor k8 is conductive with the first pull-down power supply Ipd1.

Also, since the communication signal is composed of the first voltage and the second voltage, if the first voltage is at a low value, the second voltage is at a high value and the eighth switch transistor k8 is a P-type transistor, the second voltage can turn off the eight switch transistor k8. Due to the existence of the first pull-down current, the potential of the node P is low, that is, the data processor 24 can collect a low potential (such as 0) at the node P. The first voltage can turn on the eighth switch transistor k8, so that the second power signal provided by the second power signal terminal VCC can be transmitted to the node P to pull up the potential of the node P, and at this time, the data processor 24 can collect a high potential (such as 1) at the node P. Therefore, by turning on and off the eighth switch transistor k8, the data processor 24 can collect the high potential and the low potential, and can obtain a digital signal 1 and a digital signal 0 through conversion processing, to thereby obtain the communication data through the digital signal 1 and the digital signal 0, complete the transmission of the communication data, and realize the communication function.

1.2.1.2 The charged device 20 is currently in the communication state.

At this time, the charging device 10 does not need to send a communication request signal to the charged device 20, that is, the charging device 10 can directly send a communication signal to the charged device 20.

Here, the process of sending the communication signal by the charging device 10 and the demodulation process of the charged device 20 after receiving the communication signal are similar to the relevant content in the 1.2.1.1. For the specific process, reference may be made to the above content, and the repetition will not be described.

1.2.2 The charged device 20 is the sender of the communication data, and the charging device 10 is the receiver of the communication data.

Similarly, since the charged device 20 is the sender of the communication data, the charged device 20 is in the communication state at this time, while the charging device 10 may be in the charging state or in the communication state at this time. Thus, there is a need to illustrate based on different cases.

1.2.2.1 The charging device 10 is currently in the charging state.

At this time, the charged device 20 needs to establish a communication connection with the charging device 10, that is, the charged device 20 needs to inform the charging device 10 that the communication is required, so the charged device 20 needs to send a communication request signal to the charging device 10 at first. After the charged device 20 receives a feedback from the charging device 10, the charged device 20 sends a communication signal for representing the communication data to the charging device 10.

Here, for the charged device 20, the stage of sending the communication request signal is as follows.

According to the preset communication protocol, the processor 21a can control the fifth switch transistor k5, the sixth switch transistor k6 and the seventh switch transistor k7 to be in the off state, so that the current input to the charged device 20 is relatively small, that is, the charged device 20 sends a communication request signal to the charging device 10 by reducing loads.

Of course, in actual situations, the communication request signal sent by the charged device 20 is not limited to the above, but may also be a specific signal, which is just an example for illustration. The communication request signal may be set according to actual requirements, and is not limited here.

For the charging device 10, when receiving the communication request signal: when the processor 11a detects that the load is relatively small through the transmission interface 10a, this case indicates that the charged device 20 wants to communicate with the charging device 10. At this time, the processor 11a sends a non-charging indication signal (e.g., Sc=0) to the boost conversion circuit 12a, so that the boost conversion circuit 12a reduces the voltage output to the transmission interface 10a, which is used as a feedback to inform the charged device 20.

To illustrate, in actual situations, the form of the feedback sent by the charging device may also be a low-level signal with a specific duration, or a pulse signal with a specific frequency, or a pulse signal with a specific duration and a specific frequency, etc., and may be set according to actual requirements, which is not limited here.

For the charged device 20, after receiving the feedback, the processor 21a determines that the charging device 10 is ready to communicate with the charged device 20 according to the preset communication protocol. Therefore, the charged device 20 can send a communication signal to the charging device 10 at this time, and the specific process is as follows.

The processor 21a inputs a modulation signal (e.g., TX=1) to the gate of the fifth switch transistor k5 and the gate of the seventh switch transistor k7 so that both the fifth switch transistor k5 and the seventh switch transistor k7 are in the on state, and simultaneously controls the sixth switch transistor k6 to be turned off. The fifth switch transistor k5 outputs the second pull-down current provided by the second constant current power supply Ipd2 to the transmission interface 20a, and the seventh switch transistor k7 can transmit the current provided by the first power signal terminal V2 to the transmission interface 20a.

At the same time, the processor 21a can send a modulation signal to the control terminal c of the error amplifier 22a, so that the error amplifier 22a can output a signal to the gate of the fourth switch transistor k4; the error amplifier 22a can control the fourth switch transistor k4 to be in the closed state according to a feedback current Ifb and a first reference current; and the error amplifier 22a can control the on state of the fourth switch transistor k4 according to the communication data acting on the input terminal of the error amplifier 22a, and thus control the magnitude of the current transmitted from the first power signal terminal V2 to the transmission interface 20a.

For example, when the communication data to be sent is 1, a constant current with a value of A is output to the transmission interface 20a; and when the communication data to be sent is 0, a constant current with a value of B is output to the transmission interface 20a. If A is greater than B greater than C, the transmission interface 20a can form a communication signal composed of the first voltage and the second voltage, and send the communication signal to the charging device 10.

For the charging device 10, the processing process of the communication signal when receiving the communication signal is similar to the relevant content in the 1.2.1.1. For details, reference is made to the above content, and the repetition will not be described.

1.2.2.2 The charged device 20 is currently in the communication state.

At this time, the charged device 20 does not need to send a communication request signal to the charging device 10, that is, the charged device 20 can directly send a communication signal to the charging device 10.

Here, the process of sending the communication signal by the charged device 20 and the demodulation process of the charging device 10 after receiving the communication signal are similar to the relevant content described above. For the specific process, reference may be made to the above content, and the repetition will not be described.

2. The structure shown in FIG. 4 is taken as an example where the first device is a charging device and the second device is a charged device.

2.1 A charging process is as follows.

Charging device 10: when the processor 11a determines that the charging device is currently in the charging state, the error amplifier 12b can, under the control of the processor 11a, control the second switch transistor k2 to be in the on state according to a feedback current and a first reference current, and transmit a second current signal (or voltage signal) provided by the first power signal terminal V1 to the transmission interface 10a; due to being currently in the charging state, the processor 11a can control the third switch transistor k3 to be in the off state, to prohibit from outputting the second pull-down current provided by the second pull-down power supply Ipd2 to the transmission interface 10a; and therefore, the transmission interface 10a converts the received second current signal into a charging signal and transmits the charging signal to the charged device 20.

Also, to illustrate, since the feedback current is related to the current flowing through the second switch transistor k2, the error amplifier 12b can control the magnitude of the second current signal output by the first power signal terminal V1, so that the voltage provided by the charging device 10 to the charged device 20 remains in the stable state to avoid the large fluctuation, thereby ensuring the normal progress of the charging process.

For the charged device 20, the specific working process may refer to the working process of the charged device 20 during the 1.1 charging process described above, and the repetition will not be described.

2.2 A communication process is as follows.

2.2.1 The charging device 10 is the sender of the communication data, and the charged device 20 is the receiver of the communication data.

Since the charging device 10 is the sender of the communication data, the charging device 10 is in the communication state at this time, while the charged device 20 may be in the charging state or in the communication state at this time. Thus, there is a need to illustrate based on different cases.

2.2.1.1 The charged device 20 is currently in the charging state.

At this time, the charging device 10 needs to establish a communication connection with the charged device 20, that is, the charging device 10 needs to inform the charged device 20 that the communication is required, so the charging device 10 needs to send a communication request signal to the charged device 20 at first. After the charging device 10 receives a feedback from the charged device 20, the charging device 10 sends a communication signal representing the communication data to the charged device 20.

Here, for the charging device 10, the stage of sending the communication request signal is as follows.

The processor 11a can control the error amplifier 12b to prohibit from outputting a signal to the gate of the second switch transistor k2, so that the second switch transistor k2 is turned off to thereby avoid outputting the current provided by the first power signal terminal V1 to the transmission interface 10a, that is, the charging device 10 stops supplying the electric power to the charged device 20, and thus informs the charged device 20 that the communication is required.

To illustrate, in actual situations, the form of the communication request signal sent by the charging device 10 may also be a low-level signal with a specific duration, or a pulse signal with a specific frequency, or a pulse signal with a specific duration and a specific frequency, etc., and may be set according to actual requirements, which is not limited here.

For the charged device 20, the processor 21a detects a sudden drop in the voltage signal input through the transmission interface 20a, and can determine, according to the communication protocol, that the charging device 10 wants to communicate with the device where the processor 21a is located (that is, the charged device 20). At this time: the processor 21a can control the fifth switch transistor k5, the sixth switch transistor k6 and the seventh switch transistor k7 to be in the off state, and simultaneously control the error amplifier 22a so that the fourth switch transistor k4 is also turned off, that is, the charged device 20 provides feedback to the charging device 10 by reducing loads.

Of course, in actual situations, the form of the feedback sent by the charged device 20 may also be a low-level signal with a specific duration, or a pulse signal with a specific frequency, or a pulse signal with a specific duration and a specific frequency, etc., and may be set according to actual requirements, which is not limited here.

For the charging device 10, since the case when the processor 11a in the charging device 10 detects the relatively small load through the transmission interface 10a means that the charged device 20 is ready to communicate with the charging device 10, the charging device 10 can send a communication signal to the charged device 20 at this time, and the specific process is as follows.

The processor 11a inputs a modulation signal to the control terminal c of the error amplifier 12b, so that the error amplifier 12b can output a signal to the gate of the second switch transistor k2, and the error amplifier 12b can control the second switch transistor k2 to be in the on state (or called the closed state) according to the feedback current and the first reference current; and at the same time, the error amplifier 12b can control the closing degree of the second switch transistor k2 according to the communication data acting on the input terminal, to control the magnitude of the current transmitted by the first power signal terminal V1 to the transmission interface 10a.

At the same time, the processor 11a inputs a modulation signal (e.g., TX=1) to the gate of the third switch transistor k3 so that the third switch transistor k3 is in the closed state, and outputs a second pull-down current provided by the second constant current power supply Ipd2 to the transmission Interface 10a.

Therefore, a communication signal can be formed at the transmission interface 10a and sent to the charged device 20.

For the charged device 20, the processing method of the communication signal and the process of obtaining the communication data may refer to the related content described above, and the repetition will not be described.

But the difference is: since the charged device 20 is the receiver of the communication data, when the communication control module 21 outputs a demodulation signal (RX=1) to the ninth switch transistor k9, the working processes of the processor 21a, the first comparator 21b and the second comparator 21c in the communication control module 21 are as follows.

The processor 21a determines that the received communication signal is a signal for transmitting the communication data according to the communication protocol, so the processor 21a outputs a control signal to the control terminal c of the first comparator 21b and the control terminal c of the second comparator 21c respectively, so that the first comparator 21b and the second comparator 21c start to work and can output signals to the outside.

Here, the first comparator 21b outputs a non-modulated signal (e.g., TX=0) to the current modulation module 22 according to the second reference signal provided by the second reference signal terminal Vref 2 and the communication signal, so that the current modulation module 22 currently prohibits from modulating the current signal.

The second comparator 21c outputs a demodulation signal (e.g., RX=1) to the gate of the ninth switch transistor k9 according to the third reference signal provided by the third reference signal terminal Vref 3 and the communication signal. When the ninth switch transistor k9 is an N-type transistor, the ninth switch transistor k9 is closed, so that the data processor 24 can collect the potential of the node P according to the closing and opening of the eighth switch transistor k8 to determine the communication data.

2.2.1.2 The charged device 20 is currently in the communication state.

At this time, the charging device 10 does not need to send a communication request signal to the charged device 20, that is, the charging device 10 can directly send a communication signal to the charged device 20.

Here, the process of sending the communication signal by the charging device 10 and the demodulation process of the charged device 20 after receiving the communication signal are similar to the relevant content in the above. For the specific process, reference may be made to the above content, and the repetition will not be described.

2.2.2 The charged device 20 is the sender of the communication data, and the charging device 10 is the receiver of the communication data.

In this case, the working processes of the charging device 10 and the charged device 20 are similar to the relevant content in the 1.2.2. For details, reference may be made to the above-mentioned content, and the repetition will not be described.

It should be noted that, optionally, the types of the switch transistors mentioned in the above embodiments and whether each signal is valid as a high-level signal or a low-level signal can be set according to actual requirements. The above-mentioned specific embodiments are merely used for illustration, and no specific limitation is made here.

Figure 5:
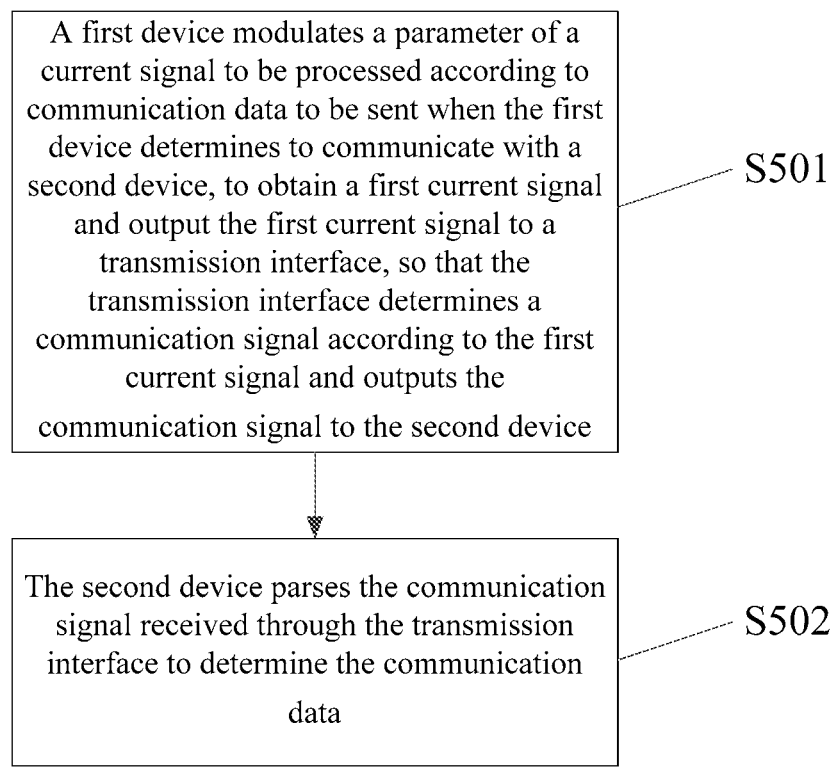
FIG. 5 is a flowchart of a communication method provided in an embodiment of the present application.

Based on the same inventive concept, an embodiment of the present application provides a communication method, and the communication method is implemented by the above-mentioned communication system provided in embodiments of the present application. As shown in FIG. 5, the communication method includes following steps.

S501: a first device modulates a parameter of a current signal to be processed according to communication data to be sent when the first device determines to communicate with a second device, to obtain a first current signal and output the first current signal to a transmission interface, so that the transmission interface determines a communication signal according to the first current signal and outputs the communication signal to the second device.

S502: the second device parses the communication signal received through the transmission interface to determine the communication data.

In this way, the first device can modulate the parameter of the current signal to be processed according to the communication data to be sent, to form a communication signal and output the communication signal to the second device; and the second device can parse the communication signal to obtain the communication data. In this way, the communication interaction between the first device and the second device is realized, which can be applied to communication scenarios between various devices, improving the flexibility of communication and also expanding the application scope of the communication system and communication method.

Figure 6:
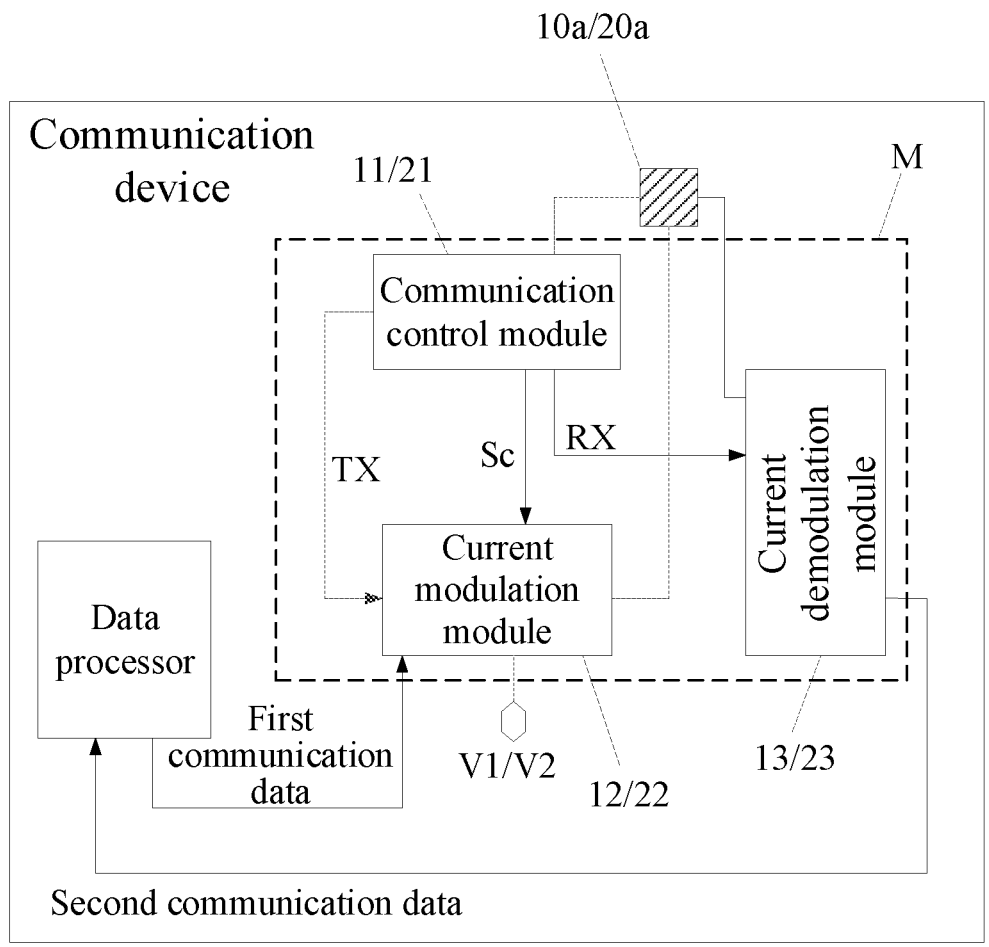
FIG. 6 is a structural schematic diagram of a communication circuit provided in an embodiment of the present application.

Based on the same inventive concept, an embodiment of the present application provides a communication circuit. As shown in FIG. 6, the communication circuit M is electrically connected to a transmission interface (10a/20a) for transmitting a signal. The communication circuit M includes: a communication control module (11/21), a current modulation module (12/22), and a current demodulation module (13/23).

The communication control module (11/21) is electrically connected to the transmission interface (10a/20a), the current modulation module (12/22) and the current demodulation module (13/23) respectively, and is configured to: send a modulation signal to the current modulation module (12/22) when determining that the communication circuit M is currently in a communication state and sends out first communication data according to the signal transmitted by the transmission interface (10a/20a); or send a demodulation signal to the current demodulation module (13/23) when determining that the communication circuit M is currently in the communication state and receives second communication data according to the signal transmitted by the transmission interface (10a/20a).

The current modulation module (12/22) is further electrically connected to the transmission interface (10a/20a) and a first power signal terminal (V1/V2) respectively, and is configured to: modulate a parameter of a current signal provided by the first power signal terminal (V1/V2) according to the first communication data under control of the received modulation signal, to obtain a first current signal and send the first current signal to the transmission interface (10a/20a), so that the transmission interface (10a/20a) determines a first communication signal according to the first current signal.

The current demodulation module (13/23) is further electrically connected to the transmission interface (10a/20a), and is configured to: parse a second communication signal received through the transmission interface (10a/20a) under control of the received demodulated signal, to determine the second communication data.

Optionally, in an embodiment of the present application, the communication circuit may be applied in a communication device, in which case the communication device may be multiplexed as a charging device; or the communication circuit may be applied in other non-charging device, in which case the device with the communication circuit may be multiplexed as a charging device; or the communication circuit may be applied in a charging device, in which case the charging device may be multiplexed as a communication device.

That is to say, as long as a device including the communication circuit can implement the communication function and the charging function, there is no specific limitation on which device the communication circuit is applied to.

Optionally, in an embodiment of the present application, the current modulation module is configured to: modulate a value and/or an output frequency of the current signal provided by the first power signal terminal to obtain the first current signal.

Optionally, in an embodiment of the present application, when the device including the communication circuit is a charging device that provides electric energy to outside, the current modulation module is multiplexed as a first charging module; the communication control module is further configured to: send a charging instruction signal to the current modulation module when determining that the communication circuit is currently in a charging state according to the signal transmitted by the transmission interface; the current modulation module is further configured to: transmit a signal provided by the first power signal terminal to the transmission interface to output electric energy when receiving the charging instruction signal.

Optionally, in an embodiment of the present application, referring to the current modulation module 12 shown in FIG. 3, when the device including the communication circuit includes a data processor 14 for providing the first communication data, the current modulation module 12 includes: a boost conversion circuit 12a and a first switch transistor k1; the boost conversion circuit 12a is electrically connected to the first power signal terminal V1, the transmission interface 10a, the communication control module 11, and the data processor 14 for providing the first communication data, respectively; a gate of the first switch transistor k1 is electrically connected to the communication control module 11, a source of the first switch transistor k1 is electrically connected to the transmission interface 10a, and a drain of the first switch transistor k1 is electrically connected to a second pull-down power supply Ipd2.

Optionally, in an embodiment of the present application, referring to the current modulation module 12 shown in FIG. 4, when the device including the communication circuit includes a data processor 14 for providing the first communication data, the current modulation module 12 includes: an error amplifier 12b, a second switch transistor k2, a third switch transistor k3, and a current sense circuit 12c; where a control terminal c of the error amplifier 12b is electrically connected to the communication control module 11, a first input terminal of the error amplifier 12b is electrically connected to a first reference signal terminal Iref 1 and a first output terminal of the data processor 14 for providing the first communication data respectively, a second input terminal of the error amplifier 12b is electrically connected to a first terminal of the current sense circuit 12c, and an output terminal is electrically connected to a gate of the second switch transistor k2; a second terminal of the current sense circuit 12c is electrically connected to the transmission interface 10a, and a third terminal of the current sense circuit 12c is electrically connected to the first power signal terminal V1; a source of the second switch transistor k2 is electrically connected to the transmission interface 10a, and a drain of the second switch transistor k2 is electrically connected to the first power signal terminal V1; a gate of the third switch transistor k3 is electrically connected to the communication control module 11, a source of the third switch transistor k3 is electrically connected to the transmission interface 10a, and a drain of the third switch transistor k3 is electrically connected to a second pull-down power supply Ipd2.

Optionally, in an embodiment of the present application, when the device including the communication circuit is a charged device that receives electrical energy provided externally, the current modulation module is multiplexed as a second charging module; the communication control module is further configured to: send a charging instruction signal to the current modulation module when determining that the communication circuit is currently in a charging state according to the signal transmitted by the transmission interface; the current modulation module is further configured to: transmit a charging signal received through the transmission interface to the first power signal terminal when receiving the charging instruction signal.

Optionally, in an embodiment of the present application, referring to the current modulation module 22 shown in FIG. 3 and FIG. 4, the current modulation module 22 includes: an error amplifier 22a, a fourth switch transistor k4, a fifth switch transistor k5, a sixth switch transistor k6, a seventh switch transistor k7, and a current sense circuit 22b; where a control terminal c of the error amplifier 22a is electrically connected to the communication control module 21, a first input terminal of the error amplifier 22a is electrically connected to a first reference signal terminal Iref 1 and a first output terminal of a data processor 24 respectively, a second input terminal of the error amplifier 22a is electrically connected to a first terminal of the current sense circuit 22b, and an output terminal of the error amplifier 22a is electrically connected to a gate of the fourth switch transistor k4; a second terminal of the current sense circuit 22b is electrically connected to the transmission interface 20a, and a third terminal of the current sense circuit 22b is electrically connected to the first power signal terminal V2; a source of the fourth switch transistor k4 is electrically connected to the transmission interface 20a and a source of the sixth switch transistor k6 respectively, and a drain of the fourth switch transistor k4 is electrically connected to the first power signal terminal V1 and a source of the seventh switch transistor k7 respectively; a gate of the sixth switch transistor k6 is electrically connected to the communication control module 21, and a drain of the sixth switch transistor k6 is electrically connected to a well Q of the fourth switch transistor k4; a gate of the seventh switch transistor k7 is electrically connected to the communication control module 21, and a drain of the seventh switch transistor k7 is electrically connected to the well Q of the fourth switch transistor k4; a gate of the fifth switch transistor k5 is electrically connected to the communication control module 21, a source of the fifth switch transistor k5 is electrically connected to the transmission interface 20a, and a drain of the fifth switch transistor k5 is electrically connected to a second pull-down power supply Ipd2.

Optionally, in an embodiment of the present application, referring to the current demodulation module (13 or 23) shown in FIG. 3 and FIG. 4, the current demodulation module (13 or 23) is further electrically connected to a first pull-down power supply Ipd1 and a second power signal terminal VCC respectively, and is configured to: parse the received second communication signal sent by the transmission interface (10a or 20a) according to a first pull-down current provided by the first pull-down power supply Ipd1 and a second power signal provided by the second power signal terminal VCC under control of the received demodulated signal, to determine the second communication data.

Optionally, in an embodiment of the present application, the current modulation module is configured to: modulate a value and/or an output frequency of the current signal provided by the first power signal terminal to obtain the first current signal; the current demodulation module is configured to: determine the second communication data according to a magnitude relationship in value and/or frequency between the second power signal provided by the second power signal terminal under control of the second communication signal and the first pull-down current.

Optionally, in an embodiment of the present application, referring to the current demodulation module 13 shown in FIG. 3, the current demodulation module 13 includes: an eighth switch transistor k8 and a ninth switch transistor k9; a gate of the eighth switch transistor k8 is electrically connected to the transmission interface 10a, a source of the eighth switch transistor k8 is electrically connected to the second power signal terminal VCC, and a drain of the eighth switch transistor k8 is electrically connected to a source of the ninth switch transistor k9; a gate of the ninth switch transistor k9 is electrically connected to the communication control module 11, and a drain of the ninth switch transistor k9 is electrically connected to the first pull-down power supply Ipd1 and a data processor 14 (which may be configured to receive the second communication data) respectively.

Optionally, in an embodiment of the present application, referring to the communication control module 11 shown in FIG. 3, the communication control module 11 includes a processor.

To illustrate, for the specific working principle and specific implementations of the communication circuit, reference may be made to the specific embodiments of the communication system in the above, and repeated description will not be repeated.

Evidently those skilled in the art can make various modifications and variations to the present application without departing from the spirit and scope of the present application. Thus the present application is also intended to encompass these modifications and variations therein as long as these modifications and variations come into the scope of the claims of the present application and their equivalents.

What is claimed is:

1. A communication circuit, the communication circuit being electrically connected to a transmission interface for transmitting a signal; wherein the communication circuit comprises: a communication control module, a current modulation module, and a current demodulation module, wherein:

the communication control module is electrically connected to the transmission interface, the current modulation module and the current demodulation module respectively, and is configured to:
  send a modulation signal to the current modulation module when determining that the communication circuit is currently in a communication state and sends out first communication data according to the signal transmitted by the transmission interface; or
  send a demodulation signal to the current demodulation module when determining that the communication circuit is currently in the communication state and receives second communication data according to the signal transmitted by the transmission interface;

the current modulation module is further electrically connected to the transmission interface and a first power signal terminal respectively, and is configured to:
  modulate a parameter of a current signal provided by the first power signal terminal according to the first communication data under control of the received modulation signal, to obtain a first current signal and send the first current signal to the transmission interface, so that the transmission interface determines a first communication signal according to the first current signal; and the current demodulation module is further electrically connected to the transmission interface, and is configured to:
  parse a second communication signal received through the transmission interface under control of the received demodulated signal, to determine the second communication data, wherein the current demodulation module is further electrically connected to a first pull-down power supply and a second power signal terminal respectively, and is configured to:
  parse the received second communication signal sent by the transmission interface according to a first pull-down current provided by the first pull-down power supply and a second power signal provided by the second power signal terminal under control of the received demodulated signal, to determine the second communication data, and wherein the current demodulation module comprises: an eighth switch transistor and a ninth switch transistor, wherein:
  a gate of the eighth switch transistor is electrically connected to the transmission interface, a source of the eighth switch transistor is electrically connected to the second power signal terminal, and a drain of the eighth switch transistor is electrically connected to a source of the ninth switch transistor; and
  a gate of the ninth switch transistor is electrically connected to the communication control module, and a drain of the ninth switch transistor is electrically connected to the first pull-down power supply and a data processor for receiving the second communication data, respectively.

2. The communication circuit of claim 1, wherein the current modulation module is configured to:
  modulate a value and/or an output frequency of the current signal provided by the first power signal terminal to obtain the first current signal.

3. The communication circuit of claim 1, wherein the current modulation module is multiplexed as a first charging module;

the communication control module is further configured to:
send a charging instruction signal to the current modulation module when determining that the communication circuit is currently in a charging state according to the signal transmitted by the transmission interface; and the current modulation module is further configured to:
transmit a signal provided by the first power signal terminal to the transmission interface to output electric energy when receiving the charging instruction signal.

4. The communication circuit of claim 3, wherein the current modulation module comprises: a boost conversion circuit and a first switch transistor;
the boost conversion circuit is electrically connected to the first power signal terminal, the transmission interface, the communication control module, and a data processor for providing the first communication data, respectively; and
a gate of the first switch transistor is electrically connected to the communication control module, a source of the first switch transistor is electrically connected to the transmission interface, and a drain of the first switch transistor is electrically connected to a second pull-down power supply.

5. The communication circuit of claim 3, wherein the current modulation module comprises: an error amplifier, a second switch transistor, a third switch transistor, and a current sense circuit, and wherein:
a control terminal of the error amplifier is electrically connected to the communication control module, a first input terminal of the error amplifier is electrically connected to a first reference signal terminal and a first output terminal of a data processor for providing the first communication data respectively, a second input terminal of the error amplifier is electrically connected to a first terminal of the current sense circuit, and an output terminal of the error amplifier is electrically connected to a gate of the second switch transistor;
a second terminal of the current sense circuit is electrically connected to the transmission interface, and a third terminal of the current sense circuit is electrically connected to the first power signal terminal;
a source of the second switch transistor is electrically connected to the transmission interface, and a drain of the second switch transistor is electrically connected to the first power signal terminal; and
a gate of the third switch transistor is electrically connected to the communication control module, a source of the third switch transistor is electrically connected to the transmission interface, and a drain of the third switch transistor is electrically connected to a second pull-down power supply.

6. The communication circuit of claim 1, wherein the current modulation module is multiplexed as a second charging module;
the communication control module is further configured to:
send a charging instruction signal to the current modulation module when determining that the communication circuit is currently in a charging state according to the signal transmitted by the transmission interface; and the current modulation module is further configured to:
transmit a charging signal received through the transmission interface to the first power signal terminal when receiving the charging instruction signal.

7. The communication circuit of claim 6, wherein the current modulation module comprises: an error amplifier, a fourth switch transistor, a fifth switch transistor, a sixth switch transistor, a seventh switch transistor, and a current sense circuit, wherein:
a control terminal of the error amplifier is electrically connected to the communication control module, a first input terminal of the error amplifier is electrically connected to a first reference signal terminal and a first output terminal of a data processor for providing the first communication data respectively, a second input terminal of the error amplifier is electrically connected to a first terminal of the current sense circuit, and an output terminal of the error amplifier is electrically connected to a gate of the fourth switch transistor;
a second terminal of the current sense circuit is electrically connected to the transmission interface, and a third terminal of the current sense circuit is electrically connected to the first power signal terminal;
a source of the fourth switch transistor is electrically connected to the transmission interface and a source of the sixth switch transistor respectively, and a drain of the fourth switch transistor is electrically connected to the first power signal terminal and a source of the seventh switch transistor respectively;
a gate of the sixth switch transistor is electrically connected to the communication control module, and a drain of the sixth switch transistor is electrically connected to a well of the fourth switch transistor;
a gate of the seventh switch transistor is electrically connected to the communication control module, and a drain of the seventh switch transistor is electrically connected to the well of the fourth switch transistor; and
a gate of the fifth switch transistor is electrically connected to the communication control module, a source of the fifth switch transistor is electrically connected to the transmission interface, and a drain of the fifth switch transistor is electrically connected to a second pull-down power supply.

8. The communication circuit of claim 1, wherein:
the current modulation module is configured to:
modulate a value and/or an output frequency of the current signal provided by the first power signal terminal to obtain the first current signal; and
the current demodulation module is configured to:
determine the second communication data according to a magnitude relationship in value and/or frequency between the second power signal provided by the second power signal terminal under control of the second communication signal and the first pull-down current.

9. The communication circuit of claim 1, wherein the communication control module comprises a processor.

10. A communication system, the communication system comprising a first device and a second device, wherein each of the first device and the second device has a transmission interface, and a transmission interface of the first device is electrically connected to a transmission interface of the second device;
the first device is configured to:
modulate a parameter of a current signal to be processed according to communication data to be sent when determining to communicate with the second device, to obtain a first current signal and output the first current signal to the transmission interface, so that the transmission interface determines a communication signal according to the first current signal and outputs the communication signal to the second device; and the second device is configured to:
parse the communication signal received through the transmission interface to determine the communication data, wherein at least one of the first device or the second device comprises a communication circuit electrically connected to a transmission interface for transmitting a signal, wherein the communication circuit comprises: a communication control module, a current modulation module, and a current demodulation module;

the communication control module is electrically connected to the transmission interface, the current modulation module and the current demodulation module respectively, and is configured to:
send a modulation signal to the current modulation module when determining that the communication circuit is currently in a communication state and sends out first communication data according to the signal transmitted by the transmission interface; or
send a demodulation signal to the current demodulation module when determining that the communication circuit is currently in the communication state and receives second communication data according to the signal transmitted by the transmission interface;

the current modulation module is further electrically connected to the transmission interface and a first power signal terminal respectively, and is configured to:
modulate a parameter of a current signal provided by the first power signal terminal according to the first communication data under control of the received modulation signal, to obtain a first current signal and send the first current signal to the transmission interface, so that the transmission interface determines a first communication signal according to the first current signal; and the current demodulation module is further electrically connected to the transmission interface, and is configured to:
parse a second communication signal received through the transmission interface under control of the received demodulated signal, to determine the second communication data, wherein the current demodulation module is further electrically connected to a first pull-down power supply and a second power signal terminal respectively, and is configured to:
parse the received second communication signal sent by the transmission interface according to a first pull-down current provided by the first pull-down power supply and a second power signal provided by the second power signal terminal under control of the received demodulated signal, to determine the second communication data, and wherein the current demodulation module comprises: an eighth switch transistor and a ninth switch transistor, wherein:
a gate of the eighth switch transistor is electrically connected to the transmission interface, a source of the eighth switch transistor is electrically connected to the second power signal terminal, and a drain of the eighth switch transistor is electrically connected to a source of the ninth switch transistor; and
a gate of the ninth switch transistor is electrically connected to the communication control module, and a drain of the ninth switch transistor is electrically connected to the first pull-down power supply and a data processor for receiving the second communication data, respectively.

11. The communication system of claim 10, wherein the first device is a charging device, and the second device is a charged device; or the first device is a charged device, and the second device is a charging device, and
wherein the transmission interface is a charging interface.

12. The communication system of claim 10, wherein the second device is configured to:
parse the communication signal received through the transmission interface according to a preset first pull-down current and a second power signal provided by a second power signal terminal, to determine the communication data.

13. The communication system of claim 12, wherein:
the first device is configured to:
modulate a value and/or an output frequency of the current signal to be processed according to the communication data, to obtain the first current signal; and
the second device is configured to:
determine the communication data according to a magnitude relationship in value and/or frequency between the second power signal provided by the second power signal terminal under control of the communication signal and the first pull-down current.

14. A communication method, wherein the communication method is implemented by the communication system according to claim 10; and the communication method comprises:
modulating, by a first device, a parameter of a current signal to be processed according to communication data to be sent when the first device determines to communicate with a second device, to obtain a first current signal and output the first current signal to a transmission interface, so that the transmission interface determines a communication signal according to the first current signal and outputs the communication signal to the second device; and
parsing, by the second device, the communication signal received through the transmission interface to determine the communication data.

* * * * *